H. WOODHOUSE.
MAP HOLDER.
APPLICATION FILED JAN. 25, 1919.

1,430,207.

Patented Sept. 26, 1922.
2 SHEETS—SHEET 1.

Inventor:
Henry Woodhouse
By his Attorney
F. DeWitt Goodwin

H. WOODHOUSE.
MAP HOLDER.
APPLICATION FILED JAN. 25, 1919.
1,430,207.
Patented Sept. 26, 1922.
2 SHEETS—SHEET 2.
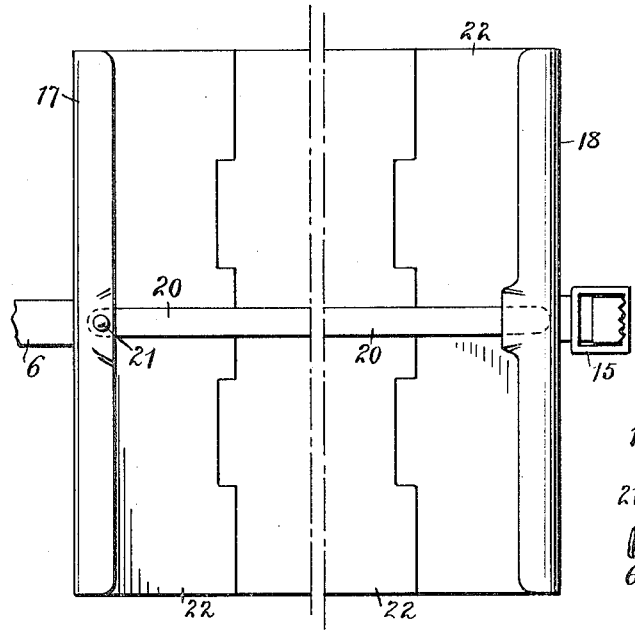
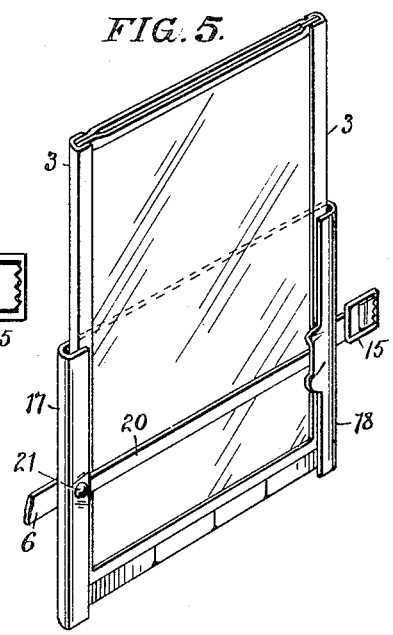
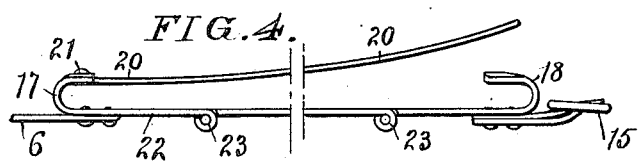
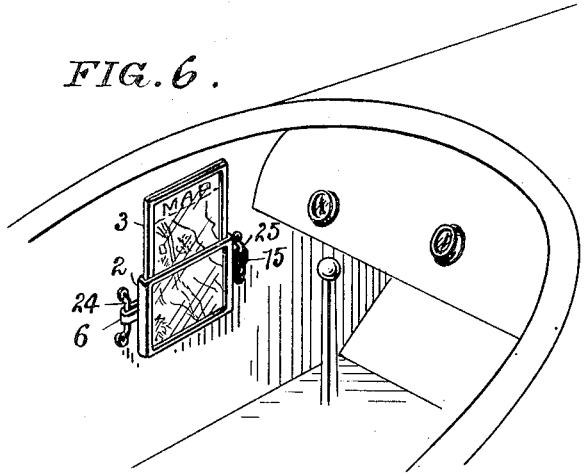
Inventor:
Henry Woodhouse
By his Attorney
F. DeWitt Goodwin Patented Sept. 26, 1922.

1,430,207

UNITED STATES PATENT OFFICE.

HENRY WOODHOUSE, OF NEW YORK, N. Y.

MAP HOLDER.

Application filed January 25, 1919. Serial No. 273,049.

*To all whom it may concern:*

Be it known that I, HENRY WOODHOUSE, a citizen of the United States, residing at New York, in the county of New York and State of New York, have invented certain new and useful Improvements in a Map Holder, of which the following is a specification.

My invention relates to improvements in map holders for aeronautic and other purposes. The object of my invention is to provide a flexible map holder of very light weight, rectangular or other shapes, which can hold maps of any size or shape and which the aviator can easily fasten to his knee or arm when traveling, so that the map may be brought closer to the eyes; a further object of my invention is to provide a map holder so light and compact that it can be carried by the aviator in his pocket or can be fastened to any part of an aeroplane or automobile; a still further object of my invention is to provide a map holder for holding photographic maps and also the maps used in the cross country flights of military and naval aviators, and protecting the maps from the rain, wind and other elements; a still further object of my invention is to provide a map holder so simple in construction and free of mechanical parts that the user can instantly take out the map to make notations on it while flying and put it back; a still further object of my invention is to provide a map holder in which the map is held tightly against the cover or jacket of transparent material, so that the print and details are shown clearly.

With my improved map holder aviators making regular trips between points a great distance apart need not touch the map itself for months after placing it in the holder. Two maps of the same route may be enclosed in the holder simultaneously so that they can be read from opposite sides of the holder, one showing the main features of the country as seen by the aviator at altitudes of up to five thousand feet and the other one showing the main features of the country as seen from altitudes of up to ten thousand feet or over, or maps of different scales may be used when traveling at different speeds.

My improved map holder is especially adapted for holding the standard maps of the Woodrow Wilson and other American airways, copyrighted by me, to the end that the map holder and the map covering a distance of a thousand miles will weigh but a few ounces.

Figure 1:
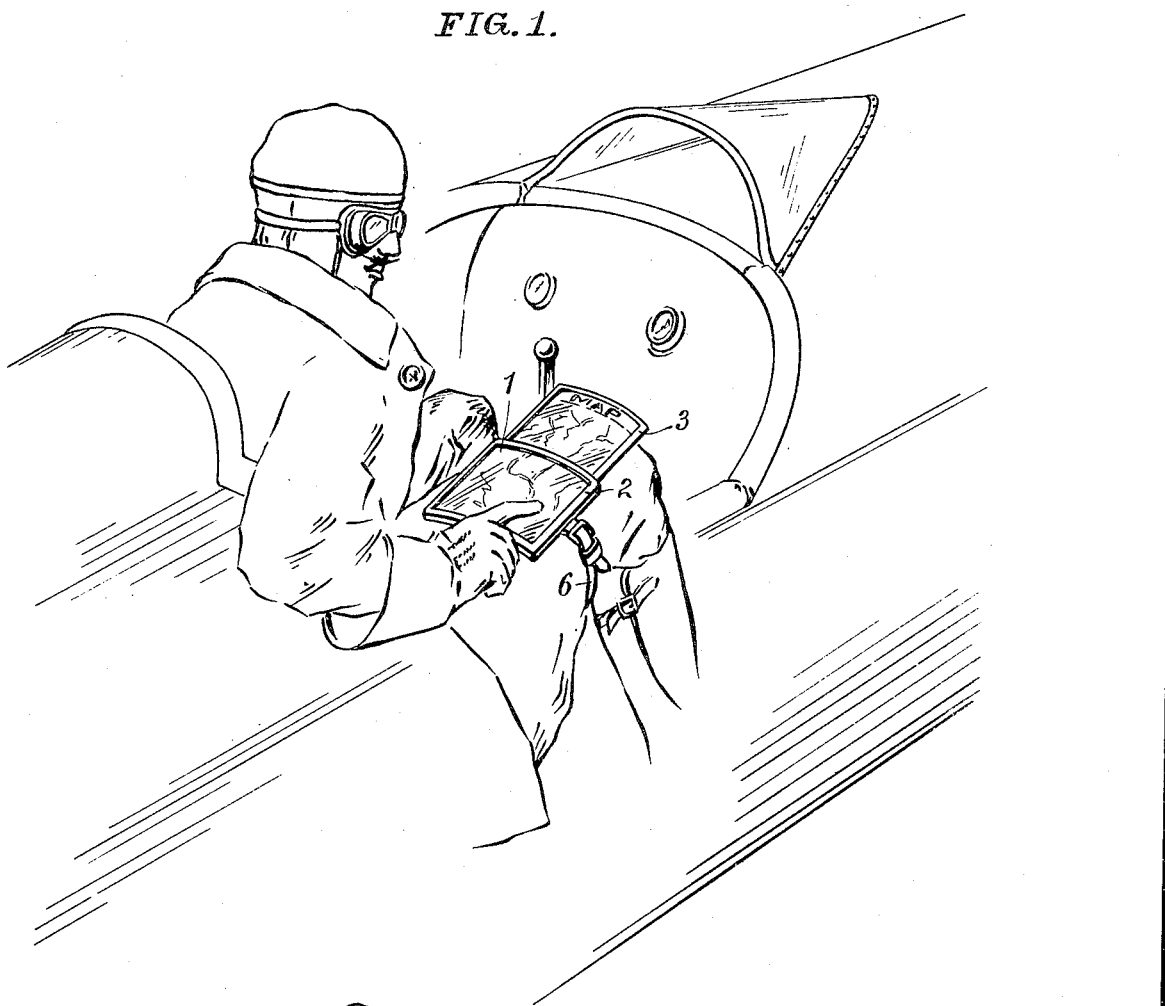
Figure 2:

Referring to the accompanying drawings; Fig. 1, is a perspective view of a portion of an aeroplane showing my map holder secured to the knee of the pilot; Fig. 2, is a perspective view of my map holder secured upon the arm of the pilot; Fig. 3, is a face view of a retainer showing a modified construction thereof; Fig. 4, is an edge view of Fig. 3; Fig. 5, is a perspective view of the retainer shown in Fig. 4, with the map jacket shown secured therein; and Fig. 6, is a perspective view of my improved map holder showing how it may be utilized by securing it in a fixed position in the cockpit of an aeroplane or automobile within view of the operator.

In the accompanying drawings in which like reference characters refer to like parts, 1 represents my improved map holder, which consists of a retainer 2 and a jacket 3, which latter is detachably held in the retainer.

The jacket 3, shown enlarged in Fig. 5, consists of a transparent envelope in which the map or chart is encased. Two sheets 4 and 5, of celluloid or non-inflammable material, such as isinglass, are secured or bound together around the edges thereof by strips of suitable material sewed to the edges, thus forming an envelope with one or more of the sides left open for the insertion of the maps or charts.

The retainer 2 consists of a device for carrying the jacket 3, so that the latter may be readily withdrawn and reversed to make the map or chart, showing from the opposite face of the jacket visible; and a strap 6 is provided upon the retainer for holding the latter in any desired position.

Secured to the sides of the retainer, or to the back portion thereof, are devices for fastening the map holder to the arm or knee, which fastening devices may consist of a strap 6, secured upon one side, and a buckle 15, secured upon the opposite side, of the retainer for securing the strap 6 therein after it has been passed around the part on which the retainer is to be secured. The flexible back 8 will permit the retainer and the map jacket to become arched to fit the leg or arm and also press the map tightly against the transparent cover, thus holding the map smooth so that it may be easily read.

The form of retainer shown in Figs. 3, 4 and 5, is made of metal with opposite edges 17 and 18 turned back upon themselves to form rigid retaining edges for the jacket 3. The transparent cover may be dispensed with and a spring plate 20 provided for holding the jacket 3 in the retainer. The said spring plate 20 is pivoted on a pin 21 on the turned edge 17 of the retainer and the free end of said plate 20 is adapted to be caught and held under the opposite turned edge 18. Said spring is of sufficient length to permit the back of the retainer to be arched without disengaging the end of the plate 20 from the side strip 18.

When the retainer is formed of rigid material the back 22 may be made in several sections secured together by hinges 23 which will permit the back to be arched. This construction is particularly adapted for carrying maps and charts of larger size, as the rigid edges and the rigid parallel sections of the back 22 will hold the map jacket with greater firmness.

Fig. 6 shows the map holder secured in the cockpit of an aeroplane or automobile by any suitable fastening devices, such as cleats 24 and 25 secured in suitable places to permit the strap 6 to be passed through them and thus secure the map holder within view of the operator, when he does not wish to carry the map holder upon his arm or knee.

Having thus described my invention I claim and desire to secure by Letters Patent:

A map holder comprising a yielding back adapted to be arched, retaining edges formed upon opposite sides of the back, said retaining edges forming longitudinal stiffening members, said retaining edges having open ends for the insertion of a map between the same, a strap having portions thereof secured to the retaining edges adapted for attaching the back to the arm or leg, and a retaining member adapted to extend between the said edges and press the map against the back.

In testimony whereof I affix my signature.

HENRY WOODHOUSE.

Witness:
DANIEL F. NUGENT.